Aug. 28, 1962　　　　　E. STUMP ETAL　　　　　3,051,506
SYSTEM FOR STABILIZING A TWIN AXLE, PARTICULARLY A TWIN REAR
AXLE OF A MOTOR VEHICLE RESPONSIVE TO
THE TRAVEL THROUGH CURVES
Filed Feb. 2, 1960　　　　　　　　　　　　　2 Sheets-Sheet 1

INVENTORS
EUGEN STUMP
PAUL E. STRIFLER
BY
ATTORNEYS

United States Patent Office 3,051,506
Patented Aug. 28, 1962

3,051,506
SYSTEM FOR STABILIZING A TWIN AXLE, PARTICULARLY A TWIN REAR AXLE OF A MOTOR VEHICLE RESPONSIVE TO THE TRAVEL THROUGH CURVES
Eugen Stump, Stuttgart-Unterturkheim, and Paul E. Strifler, Kornwestheim, Germany, assignors to Daimler-Benz Aktiengesellschaft, Stuttgart-Unterturkheim, Germany
Filed Feb. 2, 1960, Ser. No. 6,163
Claims priority, application Germany Feb. 4, 1959
13 Claims. (Cl. 280—81)

Our invention relates to a system in a motor vehicle for stabilizing a twin axle capable of steering movements in response to the travel through curves. More particularly, our invention relates to a system for stabilizing the twin rear axles of a motor vehicle in which each of said axles is guided for up and down movement and for steering movement relative to the chassis by a longitudinal link, the axles being coupled to each other for counter-rotative steering movements.

In vehicles of this type each of the twin axles will adjust itself automatically, when the vehicle travels through a curve so as to align itself with a vertical plane disposed radially to the curve, such automatic adjustment being effected by forces acting on the wheels of the axles in a direction transverse to the vehicle. Experience has shown, that vehicles of this type are liable when driven along a straight path or a slightly curved path to develop adverse angular oscillations of the twin axles.

It is the primary object of our invention to provide improved means which will counteract such oscillations preventing them altogether or limiting them to a minimum.

It is another object of our invention to provide means for optionally locking the twin axles in vertical transverse planes of the chassis, thus enabling the driver to positively prevent any steering movements of the twin axles, when the motor vehicle is driven in reverse or is traveling on slippery ground.

Further objects of our invention will appear from a detailed description of a number of embodiments thereof with reference to the drawings. We wish it to be understood, however, that our invention is in no way restricted to such details but is capable of numerous modifications within the scope of the appended claims and that the terms and phrases used in such detailed description have been chosen for the purpose of explaining our invention rather than that of restricting or limiting the same.

Figure 1:
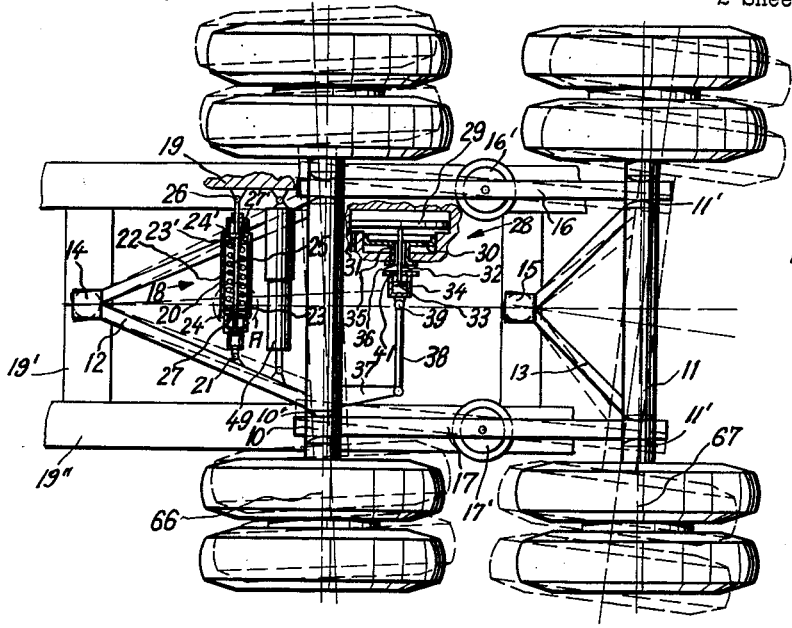
Figure 2:
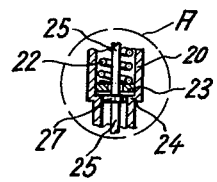
Figure 3:
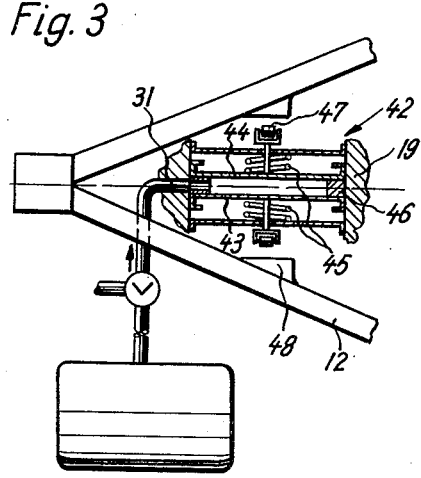
Figure 4:
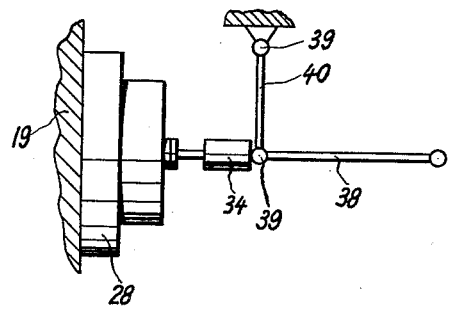
Figure 5:
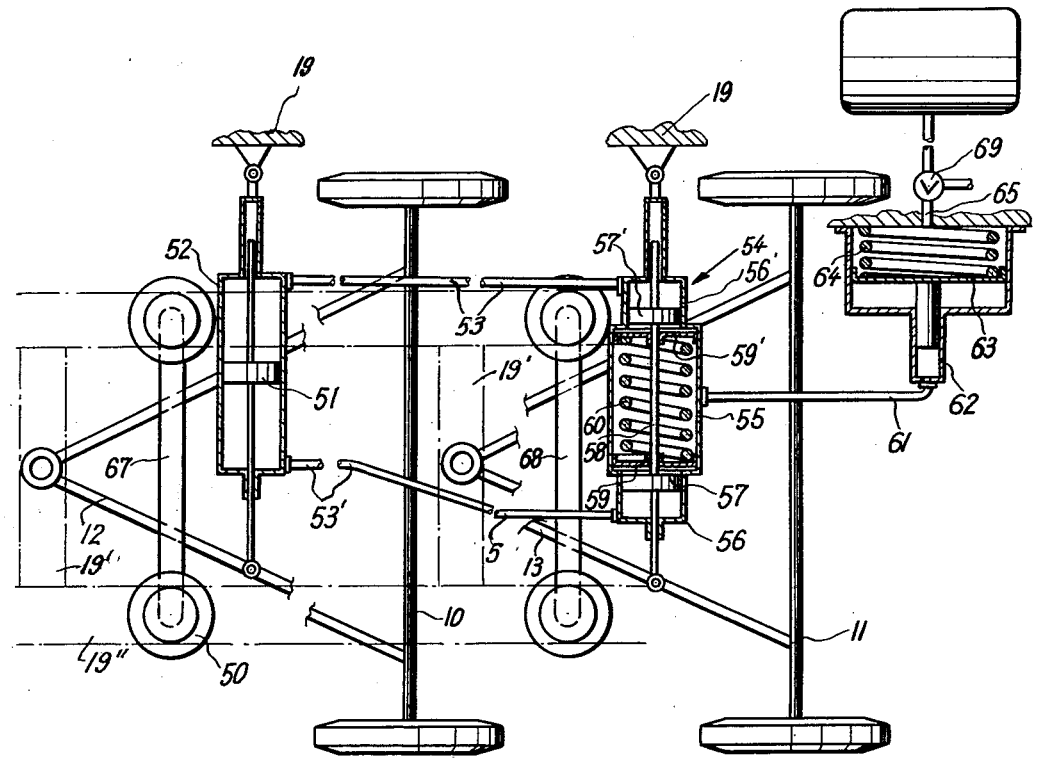

In the accompanying drawings,

FIG. 1 is a plan view of a twin rear axle of a heavy motor vehicle, the chassis being omitted therefrom except for a diagrammatic representation of parts thereof, the stabilizing means and the locking means being shown in section, FIG. 2 is a detail of the stabilizing means shown in FIG. 1 represented on an enlarged scale, FIG. 3 is a plan view of a longitudinal axle-guiding link and of an alternative embodiment of the locking means coordinated thereto, said locking means being shown in section, FIG. 4 is an elevation of the locking means shown in FIG. 1 viewed from the left with reference to FIG. 1, and FIG. 5 is a diagrammatic plan view similar to that of FIG. 1 of modified stabilizing and locking means.

According to FIG. 1, a pair of rigid axles 10 and 11 each equipped with a pair of twin wheels is guided relative to the chassis for up and down movements and for steering movements by longitudinal links 12, or 13 respectively. Each of these links is a bifurcated wishbone link which is rigidly connected to the associated axle 10, or 11 respectively, and extends forwardly therefrom to a universal joint 14, or 15 respectively, connecting the link with the chassis. Joints 14 and 15 are, for example, connected to cross members 19′ of the chassis 19 of the vehicle. Each of the universal joints 14 and 15 may be formed by a ball joint and affords the axle connected therewith by the link freedom of up and down movements and of steering movements relative to the chassis 19. The up and down movements represent oscillations of the axle and of the link rigidly connected therewith about a transverse horizontal axis of oscillation extending through the universal joint 14, or 15 respectively, whereas the steering movements represent oscillations of the axle and of the link rigidly connected therewith about a substantially vertical axis extending through the universal joint. Moreover, the axles and the links rigidly connected therewith may oscillate about the longitudinal horizontal axis extending through the universal joints 14 and 15.

Suitable coupling means are pivotally connected to the chassis and to the axles coupling the latter to each other for counter-rotative steering movements. In the embodiment shown these coupling means comprise stacks of spring leaves 16 and 17 which extend longitudinally of the vehicle and between their ends are pivotally connected to the chassis at supports 16′ and 17′, respectively, for oscillation about vertical pivot axes. The ends of the stacks of spring leaves are connected with the axles 10 and 11 for common up and down movements between stops 10′ and 11′ and for common movements transversely of the vehicle. Therefore, a steering movement of axle 10 from the position shown in full lines to the position indicated by dotted lines compels the leaf springs 16 and 17 to pivot about their vertical pivot axes at their respective supports 16′ and 17′ from the position shown in full lines to the position shown in dotted lines. As a result, the axle 11 is so turned by the leaf springs as to perform a steering movement from the position shown in full lines to the position shown in dotted lines. Hence, it will appear, that the axles 10 and 11 are coupled by the springs 16 and 17 for counter-rotative steering movements.

At least one of the axles 10 and 11, for instance the front axle 10 and the chassis 19 are pivotally connected to stabilizing means 18 for resiliently arresting the axle in a vertical transverse plane of the vehicle, such stabilizing means including a biased spring 22 which prevents the steering movement of the twin axles from their normal positions (in which their axes coincide with vertical transverse planes 66 and 67), unless the transverse forces acting on the axles and tending to impart steering movements thereto exceed a predetermined limit.

The stabilizing means 18 comprises a cylindrical spring housing 20 having end sections of reduced diameter, thus forming internal shoulders 24 and 24′. The cylindrical housing is pivotally connected to the axle 10 through the intermediary of one of the bifurcations of the wishbone link 12 to which the cylindrical housing is pivotally connected by a joint 21. The biased spring 22 is a helical spring accommodated by the central section of the housing 20 of increased diameter, the ends of this helical spring 22 engaging disks 23 and 23′ tending to hold same in abutment against the shoulders 24 and 24′. A rod 25 extends axially through the spring housing 20 and the helical spring 22 and is pivotally connected to the chassis 19 by a joint 26. Suitable means are fixed to the rod 25 outside of the disk members 23 and 23′ for engaging and actuating same in response to a longitudinal displacement of the rod 25 relative to the housing 20. In the embodiment shown, such means comprises annular members 27 and 27′ fixed to the rod. The operation is as follows: The spring 22 owing to its bias tends to keep the disk members 23 and 23′ in contact with the shoulders 24 and 24′ of the housing 20 and the disk members 23 and 23′ in that position will center the rod 25 with respect to the housing 20 and will thus cause the rod 25 to hold the axle assembly 10, 12 in its normal position. A transverse force exceeding a predetermined limit, however, will act on the axle assembly 10, 12, when the vehicle is driven through a left-hand curve of a corresponding radius of curvature. This transverse force will swing the axle assembly about the vertical axis extending through the joint 14, for instance to the position indicated by dotted lines in FIG. 1, whereby the rod 25 will cause the annular member 27′ fixed thereto to hold the disk member 23′ contrary to the force of spring 22, when the housing 20 is displaced so as to lift the shoulder 24′ from the disk member 23′. When the vehicle is driven through a right-hand curve, the opposite shoulder 24 will be lifted from the disk member 23.

Moreover, we have provided locking means connected to the chassis 19 and to at least one of the axles, for instance to the axle 10, for locking the latter in the plane 66. In the embodiment illustrated in FIG. 1 such locking means comprises a cylinder 28 mounted on the chassis 19 with its axis extending horizontally and transversely to the longitudinal direction of the chassis. A pair of pistons 29 and 30 having different diameters is movable in the cylinder 28. The diameter of the piston 29 is substantially larger than that of the piston 30. Means are provided for admitting fluid under pressure into the cylinder 28. In the embodiment shown such means comprises a suitable source of a fluid under pressure, for instance compressed air, and conduit means including a control valve connecting such source with a port 31 of cylinder 28 opening into the space between the two pistons 29 and 30. When the valve is opened, the compressed air will cause the pistons to move in opposite directions. The compressed air may be that produced in the vehicle for the actuation of the brake thereof. A piston rod 32 fixed to the piston 29 extends out of the cylinder 28 and through a hollow piston rod 35 fixed to the smaller piston 30 and is slidably guided in a guide member 34. Cooperative centering means are provided on the piston rods 32 and 35 to act on a member located between them for centering such member. The cooperative centering means comprise buffers 33 and 36, buffer 33 being fixed on the piston rod 32 and located inside of the guide member 34, whereas the buffer 36 is fixed to the hollow piston rod 35 and is disposed outside of the guiding member 34. The member located between the centering means is a flange 41 of the guiding member 34, such flange being located between the buffers 33 and 36. The guiding memebr 34 is connected to the axle 10 by a link 38 which has one of its ends pivotally connected to the guiding means 34 and its other end pivotally connected to a bracket 37 rigidly secured to the axle 10. While the link 38 extends substantially parallel to the axle 10, an upright link 40 has its upper end pivotally connected to the chassis by a pivot 39 and has its lower end pivotally connected to the guiding means 34 and the link 38 by an articulated joint 39. As a result, transverse forces only will act on the guiding member 34.

When the axle 10 is in centered position being aligned with the vertical transverse plane 66 and when the source of compressed air is cut off from the cylinder 28, the pistons 29 and 30 may assume their outer positions within the cylinder 28 keeping the associated buffers 33 and 36 in spaced relationship relative to the flange 41. When compressed air, however, is admitted through the port 31 into the cylinder 28, the pistons 29 and 30 are urged apart causing their buffers 33 and 36 to move towards the flange 41 engaging same between them and thereby centering the flange and the axle 10 connected therewith, the centering force being the difference of the forces acting on the pistons 29 and 30. The valve controlling the admission of the compressed air to the port 31 may be controlled manually or automatically, for instance in response to shifting the transmission of the motor vehicle into reverse or the like.

In FIG. 3 I have illustrated an alternative embodiment of the locking means connected to the chassis and to one of the axles for locking the latter in alignment with the transverse vertical planes 66 and 67. This embodiment comprises a cylinder 42 fixed to the chassis 19 of the vehicle, preferably in a position symmetrical to the vertical longitudinal central plane of the vehicle and between the bifurcations of the link 12, and a pair of pistons 43 and 44 movable in the cylinder 42 in opposite directions between inner positions and outer positions. Springs 45 are provided within the cylinder 42, each of said springs being inserted between one of the pistons 43, 44 and the opposed end wall of the cylinder 42, the spring being biased so as to tend to keep the pistons in their inner positions in which the pistons engage abutments 46 provided in the cylinder and connected to the wall thereof. Compressed air may be admitted through a port 31 into the space between the pistons 43 and 44. Each of these pistons has a piston rod extending out of the cylinder 42, its outer end being bifurcated and carrying a roller mounted for rotation about a horizontal axis extending lengthwise of the vehicle. A pair of opposed anvil faces 48 is provided on the link 12 for engagement by the rollers 47. When compressed air is admitted to the port 31 under control by a valve (not shown) the pistons 43 and 44 will be urged apart and will press the rollers 47 into engagement with the anvil faces 48, thereby forcing the link 12 and the axles directly and indirectly connected therewith to the centered position into alignment with the transverse vertical planes 66 and 67. The springs 45 afford a variable centering force. The rollers 47 do not interfere with an up and down springing movement of the link 12.

In the embodiments described hereinabove both the stabilizing means and the locking means are coordinated to the front axle 10. Moreover, suitable shock absorbing means may be so connected to the axle 10 and the chassis as to be responsive to the steering movements of the axle. In the embodiment illustrated in FIG. 1, this shock absorbing means is formed by a horizontal transverse shock absorber 49 of the telescope type. If desired, this shock absorber may be combined with the stabilizing means 18. If desired, the stabilizing means, the locking means and the shock absorbing means may be combined to form a single assembly. If desired, one or more of the three means just referred to may be connected with the rear axle assembly 11, 13.

In FIG. 5 we have illustrated an embodiment of our invention in which the coupling means pivotally connected to the chassis and to the axles to couple the latter to each other for counter-rotative steering movements comprises a pair of cylinders 52 and 54 secured to the chassis 19 by pivotal connections and piston means 51 and 57, 57′ slidable in the cylinders 52 and 54 respectively, and connected to one of the axle assemblies 10, 12 and 11, 13, respectively, so as to be movable in response to steering movements thereof. The cylinders 52 and 54 are connected by conduit means 53, 53' for movement of the piston means 51 and 57, 57' in opposite directions.

More particularly, each wishbone link 12, or 13 respectively, carries a transverse beam 67, or 68 respectively, rigidly connected thereto and the chassis 19 is supported on each end of the beams 67 and 68 by a suitable pressure spring 50 which may be a helical spring or a rubber spring or a pneumatic bellows.

The piston 51 slidable in the cylinder 52 is a double-acting piston, one end of its piston rod extending into a tubular extension of the cyilnder 52 pivotally connected to the chassis 19, the other end of the piston rod being pivotally connected to one of the bifurcations of the wishbone link 12. Similarly, the piston rod fixed to the pistons 57, 57' has one of its ends extending into a tubular extension of the cylinder 54 pivotally connected to the chassis 19, whereas its other end is pivotally connected to one of the bifurcations of the wishbone link 13 forming part of the rigid axle assembly 11, 13. The cylinders 52 and 54 and the conduits 53, 53' connecting their ends are filled with a suitable liquid, such as oil. A steering movement of the axle assembly 10, 12 in clockwise direction, for instance, will cause piston 51 to force liquid from cylinder 52 through conduit 53' into the cylinder 54, thereby displacing the piston means 57, 57' in a manner causing them to force liquid from the cylinder 54 through conduit 53 into the cylinder 52. As a result, the axle assembly 11, 13 is constrained to perform a steering movement in anticlockwise direction. Hence, it will appear that the cylinder and piston means 51, 52, 57, 57', 54 and 53 constitute coupling means pivotally connected to the chassis and to the axle assemblies coupling the latter to each other for counter-rotative steering movements.

The cylinder 54 serves at the same time to accommodate the stabilizing means for resiliently arresting the axle assemblies in alignment with the transverse planes 66 and 67. For this purpose, the cylinder 54 has a central section 55 of increased diameter and end sections 56, 56' of the same diameter as the cylinder 52. The conduits 53, 53' communicate with these end sections 56, 56'. The pistons 57 and 57' are slidable in the end sections 56, 56'.

Auxiliary pistons 59 and 59' of larger diameter are guided in the central section 55 of cylinder 54 and are normally held in abutment with the internal shoulders provided between the section 55 and the end sections 56, 56' by a helical spring 60 inserted within the cylinder section 55 between the auxiliary pistons 59 and 59'. The central cylinder section 55 communicates by a conduit 61 with a cylinder 62 mounted on the chassis 19 and accommodating a slidable piston 63 which is biased by a spring 64 and can be subjected to the pressure exerted by compressed air admitted through a conduit 65 under control by a valve 69. Preferably, the cylinder 62 has a section of smaller diameter communicating with the pipe 61 and a section of larger diameter communicating with the conduit 65, the piston 63 being similarly composed of two sections of different diameters.

The valve 69 is a three-way valve capable of connecting the cylinder 62 optionally with the source of compressed air or with a discharge port.

During normal travel of the vehicle the valve 69 is so set as to connect the cylinder 62 to discharge. As a result, the axle assemblies are capable of performing steering movements causing the piston means 57, 57' to reciprocate within the cylinder 54 contrary to the force exerted by the helical spring 60 and by the fluid pressure exerted upon the auxiliary pistons 59, 59' by the liquid in conduit 61 subject to the pressure exerted by the spring 64 and the piston 63. Therefore, the axle assemblies will be centered, when the vehicle is driven along a straight path or a substantially straight path. When the driver wishes to lock the axle assemblies, for instance preparatory to backing the vehicle, he will so adjust the valve 69 as to admit compressed air to the cylinder 62. As a result, the piston 63 will prevent discharge of liquid from the cylinder section 55, thus locking the auxiliary pistons 59, 59' and the piston means 57, 57' in centered position illustrated in FIG. 5.

The embodiments described are capable of numerous modifications. Thus, each of the two axle assemblies may be equipped with the stabilizing means, and/or with the locking means and/or with the shock absorbing means. If desired, the stabilizer means may be separated from the coupling means and may be combined with the locking means similar to the cylinder 62. This system may be provided for both axle assemblies or for one axle assembly only. In this case, both pistons 51 may be unilaterally connected with a conduit 53 only.

Moreover, the bias of the stabilizing spring 22, or 60 respectively, may be adjustable by suitable means.

Our invention results in an excellent guidance of the twin axle during travel along a straight path or a substantially straight path because the stabilinzing means will effectively prevent any continuous steering oscillation of the axle assemblies without, however, preventing steering movements of the axle assemblies during travel through curves of substantial curvature.

Owing to the provision of the locking means, the axle assemblies may be locked in centered position, when the vehicle is to be backed or when it is traveling on slippery ground.

Our improved stabilizing system is of particular advantage, when combined with air springs, helical springs or rubber springs.

From the foregoing it will be seen that this invention is one well adapted to attain all of the ends and objects hereinabove set forth, together with other advantages which are obvious and which are inherent to the combination.

While the invention has been described in connection with a number of preferred embodiments thereof, it will be understood that it is cpaapable of furhter modification, and this application is intended to cover any variations, uses, or adaptations of the invention following, in general, the principles of the invention and including such departures from the present discloure as come within known or customary practice in the art to which the invention pertains, and as fall within the scope of the invention or the limits of the appended claims.

What we claim is:

1. In a motor vehicle the combination comprsing a chassis, a pair of twin rear wheel axles, means including longitudinal links rigidly connected to each of said axles and pivotally connected to said chassis for affording each axle liberty of relative up and down movement of a steering movement in response to travel through a curve, coupling means pivotally connected to said chassis and to said axles coupling the latter to each other for counter-rotative steering movements and including longitudinally extending leaf springs each being mounted on said chassis between its ends for pivotal movement about a vertical axis and having its ends connected to said axles for common movement transversely to said chassis, stabilizing means for resiliently arresting at least one of said axles in a vertical transverse plane of said chassis, said stabilizing means including a biased spring and being connected to said chassis and to at least one of said axles for locking the latter in said plane.

2. The combination claimed in claim 1 further comprising shock absorbing means so connected to at least one of said axles and said chassis as to be responsive to said steering movements.

3. In a motor vehicle, the combination comprising a chassis, a pair of wheel axles, means including longitudinal links rigidly connected to each of said axles and pivotally connected to said chassis for affording each axle liberty of relative up and down movement and of a steering movement in response to travel through a curve, coupling means pivotally connected to said chassis and to said axles coupling the latter to each other for counter-rotative steering movement, stabilizing means for resiliently arresting at least one of said axles in a vertical transverse plane of said chassis, said stabilizing means including a cylindrical spring housing, a biased spring arranged within said housing, a rod extending through said housing and through said spring, members inserted between the ends of said spring and said housing, means fixed to said rod outside of said members for engaging and actuating same in response to a longitudinal displacement of said rod relative to said housing, and means for so connecting said housing and said rod to said chassis and said one of said axles as to cause relative displacement of said housing and said rod in response to a steering movement of said one of said axles, and locking means connected to said chassis and to at least one of said axles for locking the latter in said plane.

4. The combination claimed in claim 3, wherein said locking means comprises a cylinder, a pair of pistons movable in said cylinder, means for causing said pistons to move in opposite directions including means for admitting fluid under pressure into said cylinder, piston rods connected to said pistons, cooperative centering means on said piston rods, a member located between said centering means to be centered thereby, and means for connecting said member and said cylinder to said chassis and one of said axles, respectively, so as to cause relative movement between said member and said cylinder in response to steering movements of said one of said axles.

5. The combination claimed in claim 3, wherein said locking means comprises a cylinder mounted on said chassis, a pair of pistons movable in said cylinder in opposite directions, abutments in said cylinder for engagement by said pistons when the latter assume their innermost positions, springs coordinated to said pistons and tending to move the same into their innermost positions, means for causing said pistons to move from their innermost positions to their outer positions including means for admitting fluid under pressure into said cylinder, a pair of opposed anvil faces being provided on one of said links, and means connected to said pistons for engagement with said anvil faces.

6. In a motor vehicle, the combination comprising a chassis, a pair of wheel axles, means including longitudinal links rigidly connected to each of said axles and pivotally connected to said chassis for affording each axle liberty of relative up and down movement and of a steering movement in response to travel through a curve, coupling means pivotally connected to said chassis and to said axles coupling the latter to each other for counter-rotative steering movements, stabilizing means for resiliently arresting at least one of said axles in a vertical transverse plane of said chassis, said stabilizing means including a biased spring being connected to said chassis and to said one of said axles, and locking means connected to said chassis and to at least one of said axles for locking the latter in said plane, said locking means including a cylinder, a pair of pistons movable in said cylinder, means for admitting fluid under pressure into said cylinder for causing said pistons to move in opposite directions, piston rods connected to said pistons, cooperative centering means on said piston rods, a member located between said centering means to be centered thereby, and means for connecting said member and said cylinder to said chassis and one of said axles, respectively, so as to cause relative movement between said member and said cylinder in response to steering movements of said one of said axles.

7. The combination claimed in claim 6 in which said member is slidably guided on one of said piston rods and has a flange, said centering means being formed by buffers fixed to said piston rods, said flange being located between said buffers for engagement thereby.

8. The combination claimed in claim 6 in which said means for connecting said member and said cylinder to said chassis and one of said axles, respectively, includes a pair of links pivotally connected to said member, one of said links extending in a substantially horizontal direction to said axle and being pivotally connected thereto, the other link extending upwardly to said chassis and being pivotally connected thereto.

9. In a motor vehicle, the combination comprising a chassis, a pair of wheel axles, means including longitudinal links rigidly connected to each of said axles and pivotally connected to said chassis for affording each axle liberty of relative up and down movement and of a steering movement in response to travel through a curve, coupling means pivotally connected to said chassis and to said axles coupling the latter to each other for counter-rotative steering movements, stabilizing means for resiliently arresting at least one of said axles in a vertical transverse plane of said chassis, said stabilizing means including a biased spring and being connected to said chassis and to said one of said axles, and locking means connected to said chassis and to at least one of said axles for locking the latter in said plane, said locking means comprising a cylinder mounted on said chassis, a pair of pistons movable in said cylinder in opposite directions, abutments in said cylinder for engagement by said pistons when the latter assume their inner positions, a pair of opposed anvil faces being provided on one of said links, and means connected to said pistons for engagement with said anvil faces.

10. The combination claimed in claim 9 additionally comprising springs coordinated to said pistons and tending to move same into their inner positions, said cylinder being provided with means for admitting fluid under pressure causing said pistons to move from their inner positions to their outer positions.

11. The combination claimed in claim 10 further comprising a source of compressed air, and conduit means including a valve for connecting said source to said means for admitting fluid under pressure.

12. In a motor vehicle, the combination comprising a chassis, a pair of wheel axles, means including longitudinal links rigidly connected to each of said axles and pivotally connected to said chassis for affording each axle liberty of relative up and down movement and of a steering movement in response to travel through a curve, coupling means pivotally connected to said chassis and to said axles coupling the latter to each other for counter-rotative steering movements, said coupling means comprising a pair of cylinders secured to the chassis and a pair of piston means slidably mounted in said cylinders, each of said piston means being so connected to one of said axles as to be responsive to steering movements thereof, and conduit means connecting said cylinders for movement of said piston means therein in opposite directions, one of said cylinders having a central section of increased diameter and end sections of the same diameter as the other one of said cylinders, said piston means in said one of said cylinders consisting of a pair of pistons movable in said end sections and of a common piston rod fixed to said pistons, stabilizing means for resiliently arresting at least one of said axles in a vertical transverse plane of said chassis and including a pair of auxiliary pistons in said central section of increased diameter and a biased helical pressure spring inserted in said central section of increased diameter between said auxiliary pistons and tending to urge same into their outer positions, said auxiliary pistons being engageable by said pair of pistons and movable thereby inwardly from their outer positions, and locking means connected to said chassis and to at least one of said axles for locking the latter in said plane, said locking means comprising a valve-controlled source of a fluid under pressure and conduit means connecting said source to said central section for admission of said fluid under pressure to the space between said auxiliary pistons whereby said auxiliary pistons may be forced into their outer positions, thus centering said piston means and said axles connected therewith.

13. The combination claimed in claim 12 in which said valve-controlled source of a fluid under pressure comprises an additional cylinder, a piston movable therein, a biased spring in said cylinder so as to act on said piston, a conduit for compressed air and a valve connecting said conduit to said cylinder so as to admit compressed air for aiding said spring in moving said piston.

References Cited in the file of this patent

UNITED STATES PATENTS

| | | |
|---|---|---|
| 2,662,781 | Hopson | Dec. 15, 1953 |
| 2,761,693 | Stover | Sept. 4, 1956 |

FOREIGN PATENTS

| | | |
|---|---|---|
| 738,583 | Great Britain | Oct. 19, 1955 |
| 794,241 | Great Britain | Apr. 30, 1958 |